(12) United States Patent
Dinger

(10) Patent No.: US 11,261,934 B2
(45) Date of Patent: Mar. 1, 2022

(54) TORQUE TRANSMISSION DEVICE

(71) Applicant: Schaeffler Technologies AG & Co. KG, Herzogenaurach (DE)

(72) Inventor: Christian Dinger, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/965,514

(22) PCT Filed: Jan. 11, 2019

(86) PCT No.: PCT/DE2019/100021
§ 371 (c)(1),
(2) Date: Jul. 28, 2020

(87) PCT Pub. No.: WO2019/154454
PCT Pub. Date: Aug. 15, 2019

(65) Prior Publication Data
US 2021/0048092 A1 Feb. 18, 2021

(30) Foreign Application Priority Data
Feb. 6, 2018 (DE) .................. 102018102561.0

(51) Int. Cl.
*F16F 15/14* (2006.01)
*F16H 45/02* (2006.01)

(52) U.S. Cl.
CPC .... *F16F 15/145* (2013.01); *F16H 2045/0226* (2013.01); *F16H 2045/0263* (2013.01)

(58) Field of Classification Search
CPC ........ F16F 15/131; F16F 15/14; F16F 15/145; F16F 15/161; F16F 2222/12; F16H 45/02; F16H 2045/02226; F16H 2045/0263; F16H 2045/0226
See application file for complete search history.

(56) References Cited

U.S. PATENT DOCUMENTS

| 9,797,471 B2* | 10/2017 | Kram ..................... F16F 15/145 |
| 9,939,057 B2* | 4/2018 | Lee ......................... F16F 15/145 |
| 2017/0037931 A1* | 2/2017 | Maienschein ......... F16F 15/145 |
| 2020/0124132 A1* | 4/2020 | Gulluk ................ F16F 15/1203 |

FOREIGN PATENT DOCUMENTS

| CN | 104781579 A | 7/2015 |
| CN | 105074271 A | 11/2015 |
| CN | 105473890 A | 4/2016 |
| CN | 105972152 A | 9/2016 |
| CN | 106468327 A1 | 3/2017 |

(Continued)

*Primary Examiner* — Adam D Rogers

(57) ABSTRACT

A torque transmission device is disclosed having a housing that is rotatable about an axis of rotation (d) and is at least partially filled with fluid and a centrifugal pendulum device having at least two centrifugal pendulums arranged in the housing, each having a set of pendulum masses arranged to be distributed over the circumference, which are displaceably arranged along predetermined pendulum tracks in the centrifugal force field of the torque transmission device. To at least reduce a mutual influence of the at least two sets of pendulum masses, a fluidically active separating member is provided between the at least two sets of pendulum masses.

11 Claims, 2 Drawing Sheets

(56) References Cited

FOREIGN PATENT DOCUMENTS

| | | | | |
|---|---|---|---|---|
| CN | 106536971 A | 3/2017 | | |
| DE | 102013213011 A1 | 1/2014 | | |
| DE | 102013225023 A1 | 6/2014 | | |
| DE | 102014217472 A1 | 3/2016 | | |
| DE | 102016202653 A1 | 9/2016 | | |
| DE | 102017122153 A1 * | 5/2018 | ............ | F16F 15/145 |
| DE | 102018125912 A1 * | 4/2020 | ............ | F16F 15/145 |
| DE | 102018126535 A1 * | 4/2020 | ........ | F16F 15/13415 |
| DE | 102019101960 A1 * | 7/2020 | ............ | F16F 15/145 |
| WO | 2014161540 A1 | 10/2014 | | |
| WO | 2015028233 A1 | 3/2015 | | |

* cited by examiner

TORQUE TRANSMISSION DEVICE

CROSS-REFERENCE TO RELATED APPLICATIONS

This application is the U.S. National Phase of PCT Appln. No. PCT/DE2019/100021 filed Jan. 11, 2019, which claims priority to DE 10 2018 102 561.0 filed Feb. 6, 2018, the entire disclosures of which are incorporated by reference herein.

TECHNICAL FIELD

The disclosure relates to a torque transmission device having a housing rotatably arranged about an axis of rotation, at least partially filled with fluid, and a centrifugal pendulum device having at least two centrifugal pendulums arranged in the housing, each having a set of pendulum masses distributed over the circumference, in which predetermined pendulum paths are arranged to be displaceable in the centrifugal field along the torque transmission device rotating about the axis of rotation.

BACKGROUND

Torque transmission devices, for example friction clutches, double clutches, hydrodynamic torque converters, and the like, are used in drive trains of motor vehicles for the controlled transmission of torque, for example from an internal combustion engine to a subsequent drive train device, for example a transmission. Due to the fact that the internal combustion engine is subject to torsional vibrations in the torque to be transmitted, generic torque transmission devices have means for torsional vibration isolation. The torque transmission device can be in a fluid environment. For this purpose, the torque transmission device has a housing which is at least partially filled with a fluid, for example oil, water, pressure medium, or the like, in which the functional elements for torque transmission, for example one or more wet-operated friction clutches or a torque converter having pump wheel and turbine wheel and stator wheel and, if appropriate, converter lockup clutch are housed. The functional elements, for example centrifugal pendulum and possibly torsional vibration damper for torsional vibration isolation, are also designed for fluid operation.

For example, document DE 10 2014 217 472 A1 discloses a damper system which acts as a torque transmission device and in which two centrifugal pendulums are arranged to lie radially one above the other in a fluid-filled housing, each of which contains a set of pendulum masses distributed over the circumference. Here, the pendulum masses of the radially outer centrifugal pendulum are arranged on both sides of a carrier part, axially opposite pendulum masses being connected to form pendulum mass units and two pendulum bearings being provided between the carrier part and the pendulum mass units, which specify a predetermined pendulum path of the pendulum mass units and the carrier part. The radially inner centrifugal pendulum contains a carrier part formed from two axially spaced side parts, between which the pendulum masses are arranged. The self-aligning bearings are each formed between a pendulum mass and the side parts.

From the document DE 10 2013 225 023 A1, there is known a vibration isolation device effective as a torque transmission device, in which two centrifugal pendulums are arranged axially next to one another. In both torque transmission devices of the prior art, the two centrifugal pendulums influence one another by fluid coupling.

SUMMARY

The object of the disclosure is the development of a torque transmission device. In particular, a torque transmission device having at least two centrifugal pendulums should be proposed, which can be operated in a fluidic environment essentially without problems.

The proposed torque transmission device is used to transmit torque and torsional vibration isolation. In addition to at least two centrifugal pendulums, which can be matched to different absorber orders, at least one torsional vibration absorber and/or at least one torsional vibration absorber tuned to a fixed absorber frequency can serve to isolate the torsional vibrations. The torque transmission can take place, for example, by means of one or more friction clutches, for example combined to form a double clutch, a hydrodynamic torque converter, possibly in combination with a converter lockup clutch or the like.

The torque transmission device, which is arranged around a rotational axis, for example a crankshaft axis of the internal combustion engine, a transmission axis or the like, optionally with compensation for an axis offset, is operated wet or damp. The aforementioned functional elements for torsional vibration isolation and/or torque transmission in the housing are operated or at least exposed thereto by means of a fluid at least partially and possibly depending on the operating state thereof. Depending on the design of the torque transmission device, the fluid can be oil such as transmission oil, pressure fluid, for example ATF (automatic transmission fluid), brake fluid, water, a mist thereof, or the like.

The at least two centrifugal pendulums each have a set of pendulum masses distributed over the circumference, which are arranged on a carrier part along a predetermined pendulum path in the centrifugal force field of the torque transmission device rotating about the axis of rotation, having a housing rotatably arranged about an axis of rotation, at least partially filled with fluid, and at least two sets of pendulum masses being distributed in the housing over the circumference, which are arranged displaceably in the centrifugal force field of the torque transmission device rotating about the axis of rotation along predetermined pendulum tracks. The displaceable receiving of the pendulum masses on the carrier part is preferably carried out by means of two pendulum bearings spaced apart in the circumferential direction. The self-aligning bearings are each formed by mutually complementary raceways in the pendulum masses and in the carrier part, on which rolls a rolling element, for example a self-aligning roller.

To exclude or at least reduce a mutual disturbance of the pendulum movements of pendulum masses of different sets of the at least two centrifugal force pendulums, which are caused, for example, by fluid movement of the fluid, such as splash effects and/or the like, a fluidically active separating means must be provided between at least two sets of pendulum masses of different centrifugal force pendulums. The separating means is provided as a mechanical barrier to the fluid between two sets of pendulum masses. The separating means can extend over the entire circumference of a level of pendulum masses or can be provided only over partial circumferences of one pendulum mass, including the pendulum movement thereof over the predetermined oscillation angle, if necessary. The separating means can be made of metal or plastic. In the case of the use of separating sheets, the term sheet is not used exclusively for sheet metal. Rather, the term sheet can be understood to mean a purely technical development. Correspondingly provided plastic parts with a small thickness in relation to the other dimensions can be understood as sheets such as plastic sheets. The production of metal sheets is preferably carried out by stamping and, if necessary, forming processes. Plastic separating means are preferably produced by means of injection molding.

According to an advantageous embodiment of the torque transmission device, at least two sets of pendulum masses are arranged radially one above the other. In this embodiment, the separating means is arranged radially between the two sets. Alternatively, two sets of pendulum masses can be arranged axially next to one another. In this embodiment, the separating means is arranged axially between the pendulum masses. In the case of mixed forms of radial and axial arrangement of two sets with respect to one another, to avoid a fluidic disturbance of the sets, the separating means is designed accordingly between these or a fluid flow which can occur therebetween.

According to an advantageous embodiment of the torque transmission device, at least two sets of pendulum masses can be accommodated on a single carrier part by means of self-aligning bearings along pendulum tracks. The carrier part, which is designed, for example, as a flat sheet part, can accommodate pendulum masses of both sets on different diameters on both sides, axially opposite pendulum masses being connected to one another to form pendulum mass units by means of connecting means. The connecting means, for example spacer bolts, spacer plates or the like, pass through corresponding recesses in the flange part.

The separating means is in this case received radially between the two sets of pendulum masses on axially adjacent foreign components, for example a torsional vibration damper or the like, or preferably on the carrier part. When the separating means is received on the carrier part, the separating means can be attached directly to the carrier part. For example, separating sheets axially extending radially between the pendulum masses can be provided on both sides of the carrier part. These separating sheets can be connected in a positively-bonded manner to the carrier part, for example riveted, locked, or inserted as shaped separating sheets, or plugged in. Alternatively, separating sheets of similar material to the carrier part can be connected in a materially-bonded manner, for example by welding. A riveting against the carrier part can comprise a fastening on both sides of axially opposite separating sheets by means of this clamping-down rivet. The separating sheets can, for example, have an L-shaped cross-section with an axial leg for repelling fluid and a radial leg for connection to the carrier part in a positively-bonded manner with the carrier part. When welding to the carrier part, planar separating sheets can be provided which are butt-welded to the carrier part.

In an alternative form of attachment of the separating sheets to the carrier part, axially opposite separating sheets can be connected to one another. For this purpose, the carrier part has recesses which pass through at least one separating sheet, an axially fixed connection being formed between the separating sheets themselves. For example, both separating sheets can pass through the recesses and be locked together. Alternatively, one separating sheet can pass through a recess and can be locked or connected to the other, axially opposite separating sheet.

In an alternative embodiment of the torque transmission device, at least one set of pendulum masses can be arranged between two side parts forming an axial receiving area for the pendulum masses. Here, the side parts and a pendulum mass form the self-aligning bearings. Here, the separating means can be arranged axially between the side parts. For example, separating sheets can be inserted completely or by means of axially widened pins in axially opposite recesses.

BRIEF DESCRIPTION OF THE DRAWINGS

The disclosure is explained in more detail with reference to the exemplary embodiment shown in FIGS. 1 to 7. In the figures.

DETAILED DESCRIPTION

Figure 1:
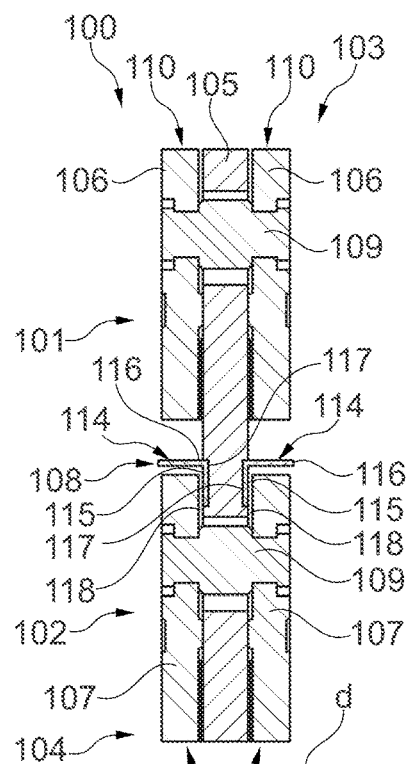
FIG. 1 shows in section the upper part of a centrifugal pendulum device of a torque transmission device, which is otherwise not shown in detail.

FIGS. 1 to 7 each show the upper part of centrifugal pendulum devices 100, 200, 300, 400, 500, 600, 700 rotatable about the axis of rotation d, each of which is housed within a housing of a torque transmission device and is exposed to the fluid present within the housing. The torque transmission devices having the housings thereof are not shown.

The centrifugal pendulum devices 100, 200, 300, 400, 500, 600, 700 each have two centrifugal pendulums 101, 102, 201, 202, 301, 302, 401, 402, 501, 502, 601, 602, each arranged radially one above the other, each having a set 103, 104, 203, 204, 303, 304, 403, 404, 503, 504, 603, 604, 703, 704 of pendulum masses 106, 107, 206, 207, 306, 307, 406, 407, 506, 507, 606, 607, 706, 707 pivotably arranged in the centrifugal force field in circumferential distribution on the carrier part 105, 205, 305, 405, 505, 605, 705.

The pendulum masses 106, 107, 206, 207, 306, 307, 406, 407, 506, 507, 606, 607, 706, 707 are arranged on a single carrier part 105, 205, 305, 405, 505, 605, 705 in the exemplary embodiments shown.

The centrifugal pendulum device 100, 200, 300, 400, 500, 600 of FIGS. 1 to 6 has a carrier part 105, 205, 305, 405, 505, 605 formed from a sheet part on both sides of which are arranged the pendulum masses 106, 107, 206, 207, 306, 307, 406, 407, 506, 507, 606, 607. Axially opposite pendulum masses 106, 107, 206, 207, 306, 307, 406, 407, 506, 507, 606, 607 are connected to pendulum mass units 110, 111, 210, 211 by means of connecting means 109, 209, 309, 409, 509, 609, 310, 311, 410, 411, 510, 511, 610, 611.

Figure 7:
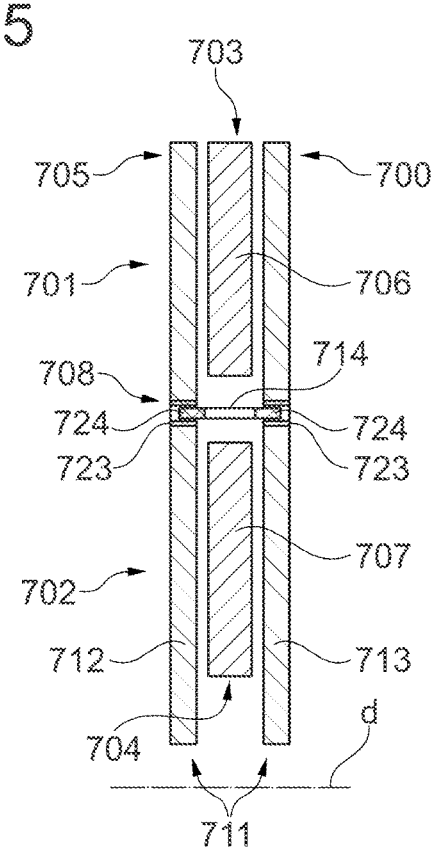

The centrifugal pendulum device 700 in FIG. 7 has two axially spaced side parts 712, 713 which form the carrier part 705 and which accommodate the pendulum masses 706, 707 therebetween.

For the fluidic separation of the sets 103, 104, 203, 204, 303, 304, 403, 404, 503, 504, 603, 604, 703, 704, the separating means 108, 208, 308, 408, 508, 608, 708 are provided radially therebetween.

The separating means 108, 208, 308, 408, 508, 608, 708 of the centrifugal pendulum devices 100, 200, 300, 400, 500, 600, 700 of FIGS. 1 to 7 are designed as follows:

The separating means 108 of the centrifugal pendulum device 100 of FIG. 1 is formed from separating sheets 114 which are angled in cross-section, one leg 115 of which is inserted into pressed sections 117 of the carrier part 105 and axially secured by means of spacer plates 118 which are axially fixedly attached to the connecting means 109. The other leg 116 of the separating sheets 114 covers the pendulum masses 107, 106 axially completely or, if necessary, beyond.

Figure 2:
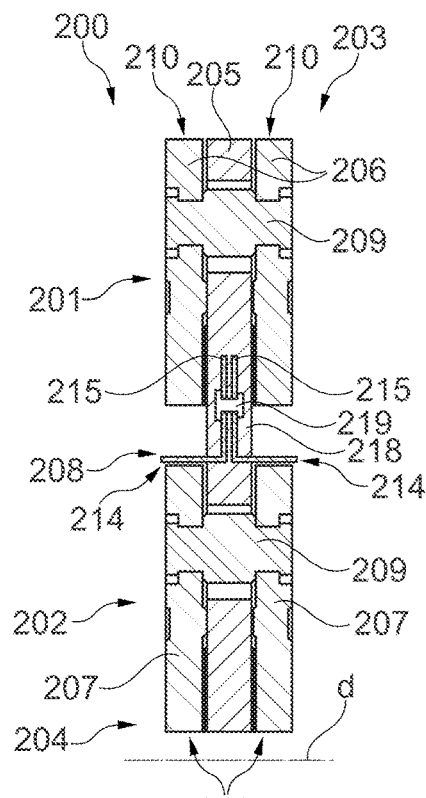
FIG. 2 shows a centrifugal pendulum device modified in comparison with the centrifugal pendulum device of FIG. 1.

The separating means 208 of the centrifugal pendulum device 200 of FIG. 2 is formed in the same way from separating sheets 214 angled in cross-section. Here, the radially outward-pointing legs 215 are inserted into recesses 218 and riveted to one another by means of the rivets 219.

Figure 3:
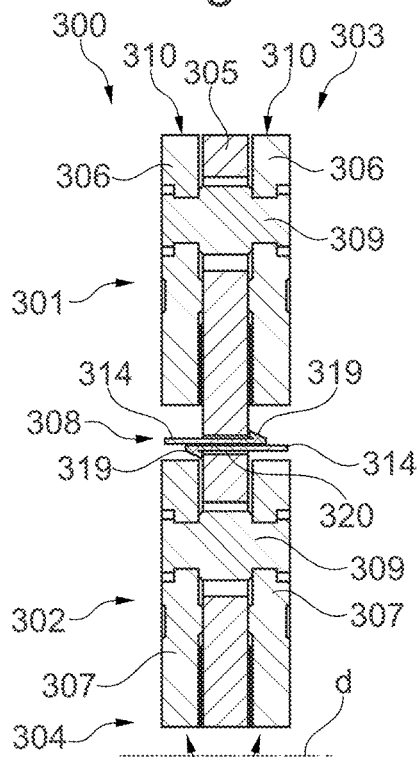
FIG. 3 shows a centrifugal pendulum device modified from the centrifugal pendulum device of FIGS. 1 and 2 in the same representation.

The separating means 308 of the centrifugal pendulum device 300 of FIG. 3 is formed from flat separating sheets 314 having end-side latching hooks 319, which are plugged in through openings 320 in the carrier part 305 and axially captively latched thereto.

Figure 4:
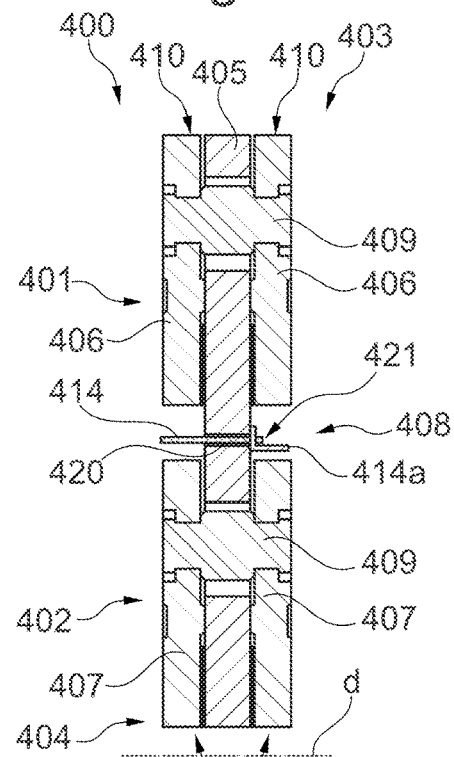
FIG. 4 shows a centrifugal pendulum device modified from the centrifugal pendulum device of FIGS. 1 to 3 in the same representation.

In contrast to the separating means 308 of FIG. 3, the separating means 408 of the centrifugal pendulum device 400 of FIG. 4 is formed from separating sheets 414, 414a, which form a bayonet-shaped connection with one another. For this purpose, the separating sheet 414 clamps down on the opening 420 of the carrier part 405 and is connected to the separating sheet 414a in a positively-bonded manner to form the bayonet connection 421.

Figure 5:
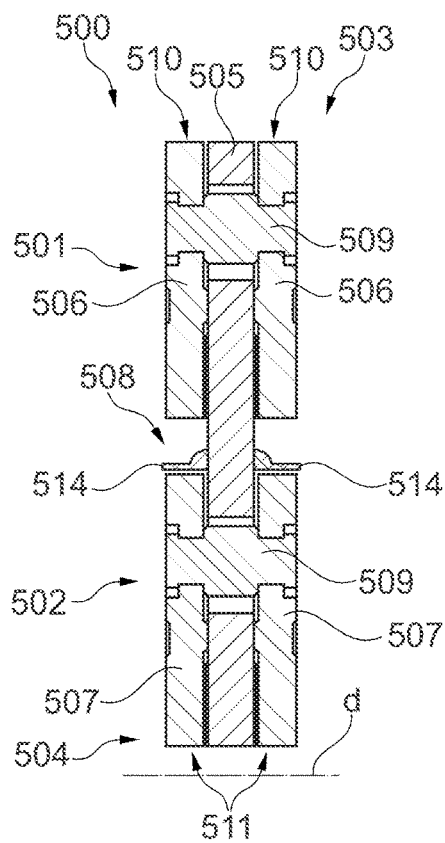
FIG. 5 shows a centrifugal pendulum device modified from the centrifugal pendulum device of FIGS. 1 to 4 in the same representation.

The separating means 508 of the centrifugal pendulum device 500 of FIG. 5 is formed from the separating sheets 514 which are axially opposite, planar and welded to the carrier part 505.

Figure 6:
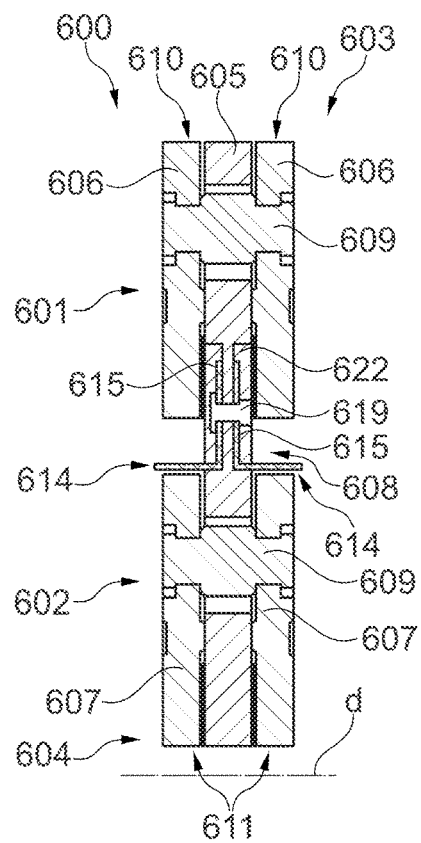
FIG. 6 shows a centrifugal pendulum device modified from the centrifugal pendulum device of FIGS. 1 and 5 in the same representation and FIG. 7 shows a centrifugal pendulum device modified from the centrifugal pendulum device of FIGS. 1 to 6 in the same representation.

The separating means 608 of the centrifugal pendulum device 600 of FIG. 6 is formed in accordance with the separating means 208 of FIG. 2 from separating sheets 614 which are angled in cross-section. In contrast to the riveting of the separating sheets 214 to one another, the radially outward-pointing legs 615 are riveted to the carrier part 605 in the tapered flange region 622. The axially opposite legs 615 are each riveted by means of the same rivet 619.

The separating means 708 of the centrifugal pendulum device 700 of FIG. 7 is formed from flat separating sheets 714, which are received on the side parts 712, 713 on the carrier part 705 by means of pins 724 engaging in axially aligned openings 723.

LIST OF REFERENCE NUMBERS

100 Centrifugal pendulum device
101 Centrifugal pendulum
102 Centrifugal pendulum
103 Set
104 Set
105 Carrier part
106 Pendulum mass
107 Pendulum mass
108 Separating means
109 Connecting means
110 Pendulum mass unit
111 Pendulum mass unit
114 Separating sheet
115 Leg
116 Leg
117 Embossing
118 Spacer sheet
200 Centrifugal pendulum device
201 Centrifugal pendulum
202 Centrifugal pendulum
203 Set
204 Set
205 Carrier part
206 Pendulum mass
207 Pendulum mass
208 Separating means
209 Connecting means
210 Pendulum mass unit
211 Pendulum mass unit
214 Separating sheet
215 Leg
218 Recess
219 Rivet
300 Centrifugal pendulum device
301 Centrifugal pendulum
302 Centrifugal pendulum
303 Set
304 Set
305 Carrier part
306 Pendulum mass
307 Pendulum mass
308 Separating means
309 Connecting means
310 Pendulum mass unit
311 Pendulum mass unit
314 Separating sheet
319 Locking hooks
320 Opening
400 Centrifugal pendulum device
401 Centrifugal pendulum
402 Centrifugal pendulum
403 Set
404 Set
405 Carrier part
406 Pendulum mass
407 Pendulum mass
408 Separating means
409 Connecting means
410 Pendulum mass unit
411 Pendulum mass unit
414 Separating sheet
414a Separating sheet
420 Opening
421 Bayonet connection
500 Centrifugal pendulum device
501 Centrifugal pendulum
502 Centrifugal pendulum
503 Set
504 Set
505 Carrier part
506 Pendulum mass
507 Pendulum mass
508 Separating means
509 Connecting means
510 Pendulum mass unit
511 Pendulum mass unit
514 Separating sheet
600 Centrifugal pendulum device
601 Centrifugal pendulum
602 Centrifugal pendulum 603 Set
604 Set
605 Carrier part
606 Pendulum mass
607 Pendulum mass
608 Separating means
609 Connecting means
610 Pendulum mass unit
611 Pendulum mass unit
614 Separating sheet
615 Leg
619 Rivet
622 Flange area
700 Centrifugal pendulum device
701 Centrifugal pendulum
702 Centrifugal pendulum
703 Set
704 Set
705 Carrier part
706 Pendulum mass
707 Pendulum mass
708 Separating means
712 Side part
713 Side part
714 Separating sheet
723 Opening
724 Pin
d Axis of rotation

The invention claimed is:

1. A torque transmission device rotatably arranged about an axis of rotation, the torque transmission device comprising: a housing at least partially filled with fluid, and a centrifugal pendulum device having a first set of pendulum masses and a second set of pendulum masses arranged over a circumference of a carrier part, which are displaceably arranged along predetermined pendulum tracks in a centrifugal force field of the torque transmission device rotating around the axis of rotation, wherein a fluidically active separating member is provided between the first and the second sets of pendulum masses, wherein the fluidically active separating member includes axially extending separating sheets arranged radially between the first and the second sets of pendulum masses on axially opposite sides of the carrier part.

2. The torque transmission device according to claim 1, wherein the first and the second sets of pendulum masses are arranged radially one above the other.

3. The torque transmission device according to claim 1, wherein the first and the second sets of pendulum masses each include at least two pendulum masses arranged on the axially opposite sides of the carrier part that are connected to each other by a connecting member.

4. The torque transmission device according to claim 1, wherein the separating sheets are each connected to the carrier part in a positively-bonded or materially-bonded manner.

5. The torque transmission device according to claim 1, wherein the axially extending separating sheets are connected to one another.

6. The centrifugal pendulum device according to claim 1, wherein the separating sheets are welded to the axially opposite sides of the carrier part.

7. A centrifugal pendulum device for a torque transmission device, the centrifugal pendulum device comprising:
a carrier plate;
a first set of pendulum masses distributed over a circumference of the carrier plate and configured to be movable along predetermined pendulum tracks;
a second set of pendulum masses distributed over the circumference and configured to be movable along predetermined pendulum tracks, wherein the first and the second sets of pendulum masses are arranged radially one above the other on the carrier plate; and
a fluid separator disposed between the first and the second sets of pendulum masses and configured to act as a fluid barrier therebetween, wherein:
the fluid separator includes first and second separating sheets each having an axially extending section and a leg extending therefrom;
the carrier plate includes first and second recessed portions; and
the leg of the first separating sheet is received in the first recessed portion and the leg of the second separating sheet is received in the second recessed portion.

8. The centrifugal pendulum according to claim 7, wherein the axially extending sections of the first and the second separating sheets axially cover the first set or the second set of pendulum masses.

9. The centrifugal pendulum according to claim 7, wherein:
the legs of the first and the second separating sheets extend radially inward toward an axis of rotation; and
the first and the second recessed portions are arranged on axially, opposite sides of the carrier plate.

10. The centrifugal pendulum according to claim 7, wherein the legs of the first and the second separating sheets extend radially outward from an axis of rotation and are riveted to each other.

11. A centrifugal pendulum device comprising:
a carrier plate;
a first set of pendulum masses distributed over a circumference of the carrier plate and configured to be movable along predetermined pendulum tracks;
a second set of pendulum masses distributed over the circumference and configured to be movable along predetermined pendulum tracks, wherein the first and the second sets of pendulum masses are arranged radially one above the other on the carrier plate; and
a fluid separator disposed between the first and the second sets of pendulum masses and configured to act as a fluid barrier therebetween, wherein:
the fluid separator includes first and second separating sheets each having an end-side latching hook;
the carrier plate includes first and second openings on axially, opposite sides thereof; and
the end-side latching hook of the first separating sheet engages with the first opening and the end-side latching hook of the second separating sheet engages with the second opening.

* * * * *